United States Patent
Gaillaud et al.

(10) Patent No.: US 12,128,724 B2
(45) Date of Patent: Oct. 29, 2024

(54) DUAL AIR COMPRESSOR FOR HYBRID VEHICLES

(71) Applicant: Volvo Truck Corporation, Gothenburg (SE)

(72) Inventors: Piérig Gaillaud, Lyons (FR); Michael Millet, Moidieu-Detourbe (FR)

(73) Assignee: Volvo Truck Corporation, Gothenburg (SE)

( * ) Notice: Subject to any disclaimer, the term of this patent is extended or adjusted under 35 U.S.C. 154(b) by 772 days.

(21) Appl. No.: 17/270,233

(22) PCT Filed: Aug. 28, 2018

(86) PCT No.: PCT/EP2018/073122
§ 371 (c)(1),
(2) Date: Feb. 22, 2021

(87) PCT Pub. No.: WO2020/043274
PCT Pub. Date: Mar. 5, 2020

(65) Prior Publication Data
US 2021/0316577 A1   Oct. 14, 2021

(51) Int. Cl.
*B60G 17/015* (2006.01)
*B60K 25/00* (2006.01)
(Continued)

(52) U.S. Cl.
CPC .......... *B60G 17/0155* (2013.01); *B60T 17/02* (2013.01); *F04B 41/02* (2013.01);
(Continued)

(58) Field of Classification Search
CPC .............. F04B 49/022; F04B 2205/063; F04B 41/06; F04B 41/02; B60T 17/02
See application file for complete search history.

(56) References Cited

U.S. PATENT DOCUMENTS 3,765,180 A * 10/1973 Brown .................... F01B 17/02
60/415
4,757,694 A * 7/1988 Espinosa .................. F25B 1/00
62/158
(Continued)

FOREIGN PATENT DOCUMENTS

| CN | 104595161 A | 5/2015 |
| CN | 102923078 B | 11/2015 |
| DE | 102011000796 A1 | 8/2012 |

OTHER PUBLICATIONS

Anonymous, "Understanding Compressor Capacity," May 1, 2016, pp. 1-6, XP055572581; retrieved from the Internet: https://s3.amazonaws.com/oneteouchsites.com/wp-content/uploads/sites/141/2016/05/19145210/CPM-Understanding_Compressor_Capacity.pdf, retrieved on Mar. 212, 2019.
(Continued)

*Primary Examiner* — Christopher S Bobish
(74) *Attorney, Agent, or Firm* — Withrow & Terranova, PLLC

(57) ABSTRACT

A system for generating air pressure in a hybrid vehicle, comprising an engine-driven air compressor (C1) configured to be selectively operated by an ICE engine, an electrically-driven air compressor (C2) configured to be operated by an electric motor, wherein said electric motor is supplied from the electric network, at least one air reservoir configured to store pressurized air and being configured to be connected directly or indirectly to both an outlet of the engine-driven air compressor (C1) and an outlet of the electrically-driven air compressor (C2), at least one electronic control unit (3, 3') configured to control at least the electrically-driven air compressor (C2) according at least to a selected drive mode of the vehicle, wherein the electrically-driven air compressor (C2) is downsized compared to the engine-driven compressor (C1), and corresponding control methods.

3 Claims, 3 Drawing Sheets

(51) Int. Cl.
*B60K 25/02* (2006.01)
*B60T 17/02* (2006.01)
*F04B 41/02* (2006.01)
*F04B 41/06* (2006.01)
*F04B 49/02* (2006.01)

(52) U.S. Cl.
CPC ............ *F04B 41/06* (2013.01); *F04B 49/022* (2013.01); *B60K 2025/005* (2013.01); *B60K 25/02* (2013.01); *F04B 2205/063* (2013.01)

(56) References Cited

U.S. PATENT DOCUMENTS

| | | | | |
|---|---|---|---|---|
| 6,036,449 | A * | 3/2000 | Nishar | B60K 25/00 417/292 |
| 6,637,230 | B2 * | 10/2003 | Iwanami | B60H 1/3208 62/196.3 |
| 6,829,893 | B2 * | 12/2004 | Doerr | B60T 17/02 417/364 |
| 7,226,273 | B2 * | 6/2007 | Doerr | B60T 17/18 417/364 |
| 8,042,331 | B2 * | 10/2011 | Schultz | F16H 61/0025 60/449 |
| 9,206,793 | B2 * | 12/2015 | Lee | F17D 1/07 |
| 9,688,260 | B2 * | 6/2017 | Aixala | B60T 17/02 |
| 10,883,482 | B2 * | 1/2021 | Nemeth | F04B 35/04 |
| 2004/0055305 | A1 * | 3/2004 | Kuroda | B60K 25/02 60/698 |
| 2004/0151606 | A1 * | 8/2004 | Doerr | B60T 17/02 417/380 |
| 2005/0173881 | A1 * | 8/2005 | Harrison | B60T 17/02 280/124.16 |
| 2005/0257545 | A1 * | 11/2005 | Ziehr | F25B 41/00 62/236 |
| 2014/0079562 | A1 * | 3/2014 | Lee | F04B 17/05 417/231 |
| 2016/0053946 | A1 * | 2/2016 | Lee | F04B 35/04 137/565.33 |
| 2021/0114537 | A1 * | 4/2021 | Assmann | B60T 17/228 |

OTHER PUBLICATIONS

International Search Report and Written Opinion for PCT/EP2018/073122, mailed Apr. 3, 2019, 13 pages.

* cited by examiner

DUAL AIR COMPRESSOR FOR HYBRID VEHICLES

This application is a 35 USC 371 national phase filing of International Application No. PCT/EP2018/073122, filed Aug. 28, 2018, the disclosure of which is incorporated herein by reference in its entirety.

FIELD OF THE INVENTION

This invention relates to a system and a method for providing compressed air supply in hybrid/eco-friendly vehicles. More particularly, the invention relates to a dual air compressor on hybrids/eco-friendly vehicles.

BACKGROUND OF THE DISCLOSURE

In the field of automotive vehicles, reliable and powerful pneumatic systems ensuring sufficient supply of air and air pressure is required for its safe functionality.

The present disclosure focuses more particularly on the pneumatic system of the hybrid/eco-friendly vehicles which is widely used for instance in hybrid trucks or city buses which are also capable to operate in zero-emission mode. The zero-emission mode ('ZE' in short) is a special drive mode of the hybrid/eco-friendly vehicles where a conventional petrol/diesel engine is turned-off while a vehicle is capable to operate/move using merely electrical energy.

In case of hybrid/eco-friendly trucks/buses, the pressurized air can be used for instance for braking or suspension leveling which requires relatively high air demand which is usually covered by running the conventional petrol/diesel engine and an associated air compressor coupled to the engine. It is however preferred to limit operation of the convention petro/diesel engine as much as possible, especially in the zero-emission mode. For that reason, it has been developed a pneumatic system having two air compressors which can be operated selectively depending on the situation, while one of the compressors is electrically powered and the second one is coupled to the conventional petro/diesel engine. This solution brings an advantage of using the pneumatic system even in zero-emission mode, where the vehicle uses merely the electric energy for running its systems, including e.g. the braking system.

An example of prior art is for instance US 2014/0079562 which teaches an apparatus for generating air pressure comprising an engine driven air compressor and an electrically operated air compressor same as engine driven compressor. These two compressors are independent from each other and each can individually provide pressurized air for to fulfill the vehicle pneumatic needs. Each compressor runs individually and running one of the compressors replaces the operation of the second one, without considering running both air compressors simultaneously. Having two compressors means added weight and increased occupied volume.

Now, as further described in the detailed description of the invention, the inventors have endeavored to find a new solution for providing pneumatic systems, with the goal of reducing the weight and occupied volume by the air compressors. Another goal is to still provide sufficient air flow and air pressure for supplying various number of systems even in cases where high demand for air is needed, especially for heavy-duty trucks or buses equipped with hybrid technology (e.g. eco-friendly vehicles).

SUMMARY OF THE DISCLOSURE

According to one aspect of the present invention, it is disclosed a system for generating air pressure in a hybrid vehicle, comprising:

- an engine-driven air compressor configured to be selectively operated by an ICE engine;
- an electrically-driven air compressor configured to be operated by an electric motor, wherein said electric motor is supplied from the electric network;
- at least one air reservoir configured to store pressurized air and being configured to be connected directly or indirectly to both an outlet of the engine-driven air compressor and an outlet of the electrically-driven air compressor;
- at least one electronic control unit configured to control at least the electrically-driven air compressor according at least to a selected drive mode of the vehicle;
- wherein the electrically-driven air compressor is downsized compared to the engine-driven compressor.

The expression downsized means that the electrically-driven air compressor is smaller and provides less air flow and air pressure compared to the engine-driven air compressor.

Thanks to this arrangement, it is possible to provide a pneumatic system for hybrid or eco-friendly vehicles, where the electrically-driven air compressor is designed to be smaller than the engine-driven air compressor and offers more freedom for arrangement and integration in the respective hybrid or eco-friendly vehicle (room optimization). Manufacturers has thus ability to design their vehicles in a way of having less fuel consumption due to less weight of the electrically-driven air compressor, or the vehicles can be more compact (regarding their size) since the space required for the pneumatic system is smaller while a pneumatic capability of the pneumatic system is at least the same or even higher compared to the known vehicles already in operation. Besides, another advantage of this arrangement is lower costs compared to the conventional air compressors having the same dimensions and weights as the engine-driven air compressor. Additionally, the smaller electrically-driven air compressor requires less power consumption and allows easier integration into an electric system of the vehicle.

Besides, by the expression "ICE" it is meant an Internal Combustion Engine, for instance known conventional types of diesel or petrol engines used in automotive field suitable for use in hybrid/eco-friendly vehicle.

As mentioned above, by the expression "being indirectly connected" it is meant, that a device can be interposed between the at least one air reservoir and the outlets of the engine-driven air compressor and electrically-driven air compressor. The device interposed between the at least one air reservoir and the outlets of the engine-driven air compressor and electrically-driven air compressor can be for instance an air dryer or an overflow valve.

According to another aspect, the selective operation of the engine-driven air compressor may be provided by a clutch.

According to another aspect, the working pressure range of the electrically-driven air compressor lies within 7.2 to 11 bar, whereas the working pressure of the engine-driven air compressor lies within 7.2 to 13 bar.

The working pressure of the air compressor is the range of the minimum acceptable pressure threshold and the maximum threshold when the compressor provides a sufficient air pressure/air flow.

According to another aspect, an output air flow range of the electrically-driven air compressor lies within 100 to 250 l/min at maximum pressure of 11 bar, whereas an output air flow range of the engine-driven air compressor lies within 300 to 2000 l/min at maximum pressure of 13 bar, preferably within 600 to 2000 l/min at maximum pressure of 13 bar.

According to another aspect, a pneumatic capability of an air compressor is defined by a maximum air flow output at a maximum pressure rating for a given compressor, and wherein a pneumatic capability of the electrically-driven air compressor lies within 5% to 60% of a pneumatic capability of the engine-driven air compressor, preferably within 10% to 60% of a pneumatic capability of the engine-driven air compressor.

According to another aspect, the electronic control unit is configured to operate the electrically-driven air compressor alone when the engine-driven air compressor is not operated or simultaneously with the engine-driven air compressor when the engine-driven air compressor is operated.

Regardless of the downsized electrically-driven air compressor, the system has an ability to be operated merely by the electrically-driven air compressor which is capable to provide a sufficient pressure, sufficient air flow and pneumatic capability, such that the hybrid or eco-friendly vehicle might be operated without the ICE engine running (e.g. moving of the vehicle is provided by an electric motor or motors connected to a battery unit—known as zero-emission mode) while the sufficient amount of pressurized air is being supplied to the pneumatic system or systems.

According to another aspect, there is defined a single-compressor pneumatic capability of the engine-driven air compressor for the vehicle of interest and wherein both the engine-driven air compressor and electrically-driven air compressor are operated at maximum power to provide a boost mode defined as providing a pneumatic capability up to 160% of the single compressor pneumatic capability.

The boost mode enables to provide a sufficient air flow and air pressure where the air demand is higher than that in normal situation. The boost mode enables to operate one or more pneumatic systems simultaneously. An example of such higher air demand is to have a vehicle which can be for instance provided with a pneumatic brake system and pneumatic suspension system (e.g. hybrid city bus). The boost mode thus enables to provide sufficient amount of air and sufficient amount of air pressure to operate (e.g. pressurize) the braking system and at the same time to supply the pneumatic suspension system for adjusting the height of the vehicle.

According to another aspect, the engine-driven air compressor is downsized to provide 50% to 80% of the single-compressor pneumatic capability, whereas the pneumatic capability of the electrically-driven air compressor is between 20% to 50% single-compressor pneumatic capability, such that simultaneous operation of both air compressors provides at least 100% of the single-compressor pneumatic capability.

According to another aspect, a weight of the electrically-driven air compressor itself (weight of the electric motor is excluded) is less than 70% of a weight of the engine-driven air compressor, preferably less than 60% of a weight of the engine-driven air compressor, and more preferably less than 50% of a weight of the engine-driven air compressor.

According to another aspect, dimensions of the electrically-driven air compressor are circumscribed in a volume of 600 mm×360 mm×370 mm in terms of length×width×height, or preferably of 500 mm×260 mm×270 mm in terms of length×width×height.

According to another optional aspect, the power consumption range of the engine-driven air compressor lies within 1 to 6 kW, whereas the power consumption range of the electrically-driven air compressor lies within 1.5 to 2.5 kW.

This arrangement further enables to provide lower electric power consumption which might extend the driving range of the hybrid or eco-friendly vehicle in full electric drive mode, known as ZE mode (zero-emission mode).

According to another aspect, the selected drive mode (operation mode) of the vehicle is chosen among ICE mode, zero-emission mode (ZE), boost mode, combined mode and high torque demand mode.

According to another aspect, the pressured air stored in the at least one air reservoir is used for braking system, suspension system or any other pneumatic system of the vehicle.

A large variety of pneumatically operated devices can be thereby supplied from the compressors and the reservoir(s).

According to another aspect, the clutch is pneumatically operated.

Moreover, the clutch may be controlled by the electronic control unit.

According to another aspect, the system further comprises a pressure sensor configured to sense an air pressure prevailing in the at least one air reservoir.

According to another aspect, the pressure sensor is connected to the electronic control unit for providing information to manage the operation between the engine-driven air compressor and the electrically-driven air compressor.

The pressure sensor connected to the electronic control unit enables to manage the maximum and minimum threshold values (high and low threshold values cut-in 1, cut-in 2, cut-off 1 and cut-off 2) in the pneumatic system and is further capable to selectively choose between the drive modes.

According to another aspect, a method to control a system for generating air pressure in a hybrid vehicle is provided, said system to be controlled comprises:

an engine-driven air compressor configured to be selectively operated by an ICE engine;

an electrically-driven air compressor configured to be operated by an electric motor, wherein said electric motor is supplied from the electric network;

at least one air reservoir configured to store pressurized air and being configured to be connected directly or indirectly to both an outlet of the engine-driven air compressor and an outlet of the electrically-driven air compressor;

at least one electronic control unit configured to control the electrically-driven air compressor and the operation of the engine-driven air compressor;

and said method comprising:

when the ICE engine is in operation, running the engine-driven air compressor while the electrically-driven air compressor being stopped, wherein running of the engine-driven air compressor depends upon first low and high threshold values (cut-in 1, cut-off 1), the first low threshold value (cut-in 1) turns on and the first high threshold value (cut-off 1) turns off the engine-driven air compressor;

when the ICE engine is in operation, running the electrically-driven air compressor while the engine-driven air compressor being stopped, wherein running of the electrically-driven air compressor depends upon second low and high threshold values (cut-in 2, cut-off 2), the second low threshold value (cut-in 2) turns on and the second high threshold value (cut-off 2) turns off the electrically-driven air compressor;

when the ICE engine is not in operation, running the electrically-driven air compressor dependent upon the second low and high threshold values (cut-in 2, cut-off 2 when the ICE engine is in operation, running both the engine-driven air compressor and the electrically-driven air compressor, wherein running of both the compressors is provided as long as the pressure in at least one air reservoir is below the second high threshold value (cut-off 2).

According to the aspects mentioned above, the pneumatic system and corresponding method enables to provide a pneumatic system with the electrically-driven air compressor which provides more ability with regard to the required space in the hybrid or eco-friendly vehicles, has lower electric power consumption and thus improved and extended driving range of the vehicle is provided. Further, the lower weight and downsized dimension reduce costs for manufacturing. The system is also capable to provide the boost mode where a high demand for air is needed and the operation of one or more pneumatic systems can be provided with sufficient air flow and air pressure. Further, capability of the system such as to run merely the electrically-driven air compressor even in case of the ICE engine being turned on, further helps to organize air delivery in the pneumatic system, decrease fuel consumption of the ICE engine and reduce pressures inside the system which might avoid unnecessary damages during long-term usage.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION OF THE DISCLOSURE

In the figures, the same references denote identical or similar elements, unless stated otherwise.

System Overview

Figure 1:
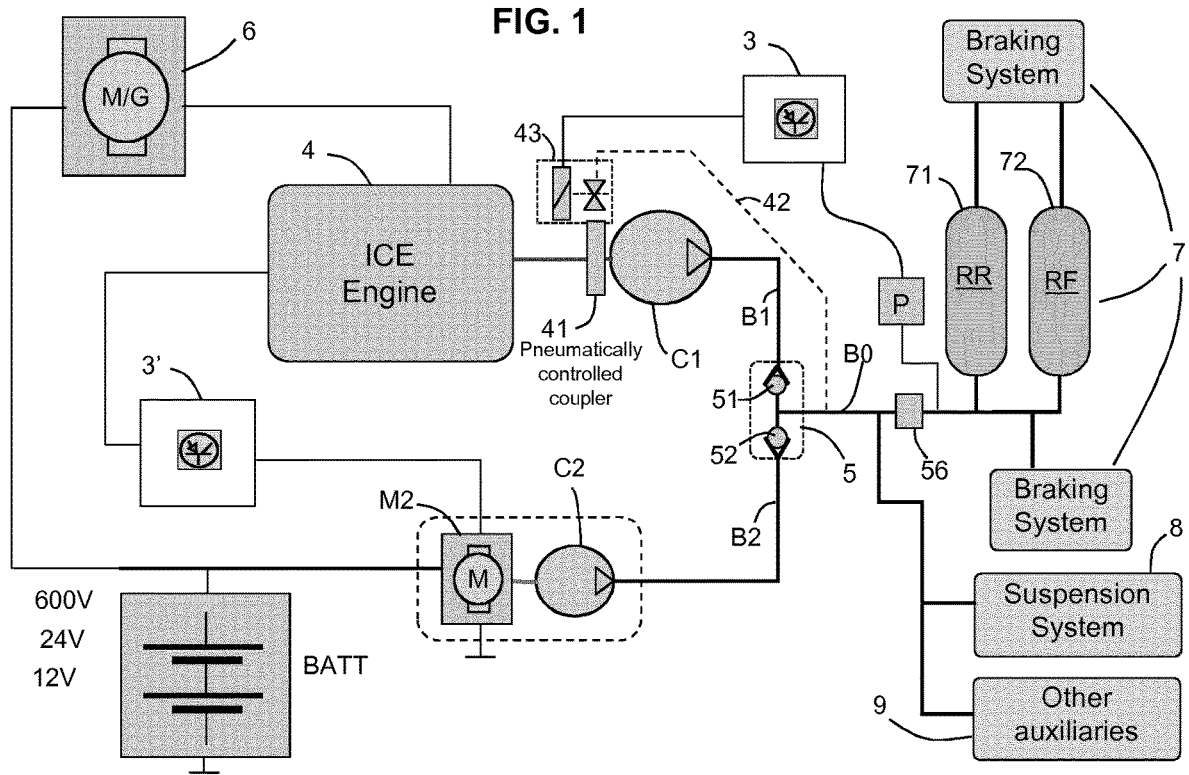
FIG. 1 shows an overall schematic layout of an air supply system according to the present disclosure.

FIG. 1 shows a diagrammatical circuit layout of a dual air compressor pneumatic system for hybrid/eco-friendly vehicles. The hybrid/eco-friendly vehicle may be any type of vehicle which is capable to operate in low emission mode or preferably in zero-emission mode. The hybrid/eco-friendly vehicles are preferably buses, trucks, off-road vehicles or the like, where a high demand for compressed air is usually required.

The pneumatic system shown in FIG. 1 comprises two or more air compressors that provide compressed air to the braking system 7 of the vehicle. The compressed air is the main working fluid to achieve the braking function, and as known per se some air is lost each time brakes are released.

In addition, the pneumatic system can also be involved in other vehicle systems like the suspension system 8. Further the pneumatic system can also be involved in auxiliaries systems 9 that may depend on the purpose of the vehicle. For example, compressed air may be used in an onboard crane system or a hauling system. The pneumatic system can operate in different modes according to various driving phases/modes when the vehicle is moving and/or, if relevant for the type of truck, according to various operation modes when the vehicle is at work at null speed.

The dual air compressor pneumatic system as shown in FIG. 1 includes an ICE (Internal Combustion Engine) engine 4 connected to an engine-driven air compressor C1. The ICE engine 4 can be any type of petrol/diesel engine suitable for the associated hybrid/eco-friendly vehicle. The engine-driven air compressor C1 is mechanically coupled/connected to the ICE engine 4. The coupling between the ICE engine 4 and the engine-driven air compressor C1 might be provided by various different ways. For instance, as shown in an example of FIG. 1, the coupling might be provided by a pneumatically controlled coupler 41. The coupler 41 might be represented by an external device (e.g. a clutch) or by an internal device (e.g. a pneumatic valve, or permanent connection provided by a shaft). In one example, the pneumatically controlled coupler 41 might connect one shaft of the ICE engine 4 to the rotor of the engine-driven air compressor C1. In this case, the coupler 41 might be a clutch 41.

Further, in another embodiment not shown in Figures, the coupling between the ICE engine 4 and the engine-driven air compressor C1 might be a direct connection where the shaft directly connects the ICE engine 4 and the rotor of the engine-driven air compressor C1. The selective operation of the engine-driven air compressor C1 might be provided using a pneumatic valve or any suitable type of valve for the same purpose. In the example shown in FIG. 1, the pneumatically controlled coupler 41 can selectively couple the rotor of the engine-driven air compressor C1 to one shaft of the ICE engine 4 (e.g. via a belt or gear driven from the crankshaft). The coupler 41 can be ON or OFF. In ON position, the coupler 41 can engage connection between the ICE engine 4 shaft and the engine-driven air compressor C1 rotor. In OFF position, the coupler 41 can disengage connection between the shaft of the ICE engine 4 and the rotor of the engine-driven air compressor C1.

The pneumatically controlled coupler 41 can be operated from a pneumatic pressure supply pipe 42, via an electro-pneumatic valve 43. It is however not excluded to have an electromagnetic clutch to engage/disengage connection between the shaft of the ICE engine 4 and the rotor of the engine-driven air compressor C1.

The pneumatically controlled coupler 41 can be controlled by an electronic control unit 3. More precisely, the electronic control unit 3 is configured to selectively control the electro-pneumatic valve 43 of the coupler 41 depending on a selected drive/operation mode (as explained later).

The engine-driven air compressor C1 can be of any known types of air compressor suitable for providing pressurized air to the pneumatic system depending on the dimension and required pneumatic capability of the vehicle. From the above it is thus understood that the engine-driven air compressor C1 is selectively operated by the ICE engine 4. The selective operation can be provided via the pneumatically controlled coupler 41, for instance represented by the clutch 41.

The system as shown in FIG. 1 includes an electrically-driven air compressor C2 operated by an electric motor M2.

The connection between the electrically-driven air compressor C2 and the electric motor M2 is mechanical. Preferably, no clutch or any device for selective connection is provided between the electrically-driven air compressor C2 and the rotor of the electric motor M2. The electric motor M2 is supplied from the electric power network provided in the vehicle. The electric motor M2 can be powered by a battery unit (BATT) or can be powered directly from a motor/generator 6 (M/G in short). The electric power network may comprise at least the main battery unit (BATT) or the motor/generator 6, both can produce a voltage in any suitable range depending on selected electric motor M2 which is connected to the electrically-driven air compressor C2.

There may be provided the step-up converter (not shown), or a step down converter (not shown) or an inverter (not shown) in case the electric motor M2 operates under a voltage not directly available at the vehicle power network.

The voltage of the electric power network can be for instance 12 V, 24 V, 400 V or 600 V or any other value suitable for the vehicle and the electric motor M2. The voltage can be thus supplied to the electric motor M2 independently from both the battery unit (BATT) and the motor/generator 6 depending on a selected drive/operation mode (as explained later).

The motor/generator 6 is used selectively to move the vehicle in ZE mode (motor mode), or to recharge the battery (generator mode). The motor/generator 6 can be used in drivetrain boost mode (ICE engine 4+M/G 6 contributing to torque and vehicle motion).

The electronic control unit (3, 3') (or more electronic control units) can be connected to the electric motor M2 and the ICE engine 4. Depending on the selected drive mode or air demand, the electronic control unit (3, 3') can turn on or off the electric motor M2 or cause the ICE engine to be started or stopped. The electronic control unit (3, 3') for controlling the electric motor M2 can be the same (physically) as the one for controlling the C1 coupler 41 or a different one. Therefore, the system can have at least one electronic control unit (3, 3'). As shown in FIG. 1, the system is provided with two electronic control units, namely a first control unit 3 for controlling the coupler 41, and a second control unit 3' for controlling the motor M2. The electronic control unit (3, 3') may include a diagnoses function for monitoring the proper operation of the compressors. In the vehicle electronic system, there may be provided additional controllers not shown at the figures, like engine controller, motor/generator controller, vehicle central unit, etc. . . .

Reservoirs and Piping

The pneumatic system comprises one or more compressed air reservoir(s), likewise called tank(s). The at least one air reservoir can be connected directly or indirectly to both an outlet of the engine-driven air compressor C1 and an outlet of the electrically-driven air compressor C2. The indirect connection means that the inlet pipe of the air reservoir(s) is not directly connected to the outlets of the engine-driven air compressor C1 and/or electrically-driven air compressor C2. That is, a device can be disposed between the air reservoir(s) and the outlets of the engine-driven air compressor C1 and/or electrically-driven air compressor C2. Said device can be represented for instance by an air dryer or one or more overflow valves, collectively represented by block 56 on FIG. 1. In the shown example in FIG. 1, there are depicted two reservoirs RR and RF. The skilled person can recognize the primary brake reservoir 71 (RR "rear" reservoir) and the secondary brake reservoir 72 (RF "front" reservoir) providing redundancy, which constitutes a dependable solution. The reservoir(s) store(s) pressurized air for the pneumatic system. Besides, the pressurized air from the at least one air reservoir can be used for the pneumatic braking system or pneumatic suspension system or any other pneumatic system of the vehicle.

In addition, there is provided a first pneumatic conduit (first branch B1) to supply a common trunk portion B0 from the engine-driven air compressor C1. The first pneumatic conduit B1 supplies pressurized air from the engine-driven air compressor C1 through the common trunk portion B0 to at least one or more air reservoir(s) RR, RF. There is provided a second pneumatic conduit (second branch B2) to supply the common trunk portion B0 from the electrically-driven air compressor C2. The second pneumatic conduit B2 supplies pressurized air form the electrically-driven air compressor C2 through the common trunk portion B0 to at least one or more air reservoir(s) RR, RF.

Furthermore, the pneumatic system is provided with a valve device 5 which connects the first pneumatic conduit B1, the second pneumatic conduit B2 and the common trunk portion B0 together. The valve device 5 can consist of two or more check valves (51, 52). In the pneumatic system shown in FIG. 1, there is provided a first check valve 51 and a second check valve 52. The first check valve 51 can be directly connected to the first pneumatic conduit B1 and the second check valve 52 can be connected to the second pneumatic conduit B2.

Depending on pressurized air coming from the engine-driven air compressor C1 or the electrically-driven air compressor C2, the valve device 5 may operate in several different states. Since the first check valve 51 is connected to the first pneumatic conduit B1 and the engine-driven air compressor C1 generates compressed air, the first check valve 51 enables pressurized air to flow to the common trunk portion B0 while the second check valve 52 is closed. Therefore, no air generated by the engine-driven air compressor C1 can be supplied to the second pneumatic conduit B2.

Since the second check valve 52 is connected to the second pneumatic conduit B2 and the electrically-driven air compressor C2 generates compressed air, the second check valve 52 enables pressurized air to flow to the common trunk portion B0 while the first check valve 51 is closed. Therefore, no air generated by the electrically-driven air compressor C2 can be supplied to the first pneumatic conduit B1.

Furthermore, in case of both the engine-driven air compressor C1 and the electrically-driven air compressor C2 generate compressed air and the pressure at the trunk portion B0 is low, the valve device 5 operates in "dual" mode (both check valves open), where air from the first pneumatic conduit B1 and the second pneumatic conduit B2 is mixed in the valve device 5 and guided toward the common trunk portion B0. "Dual" mode can be seen as an "addition mode" since both first and second check valves 51, 52 are open and both compressors provide air flow in additive fashion to the trunk section B0.

Pressure Control and Basic Modes

Further, there can be provided a pressure sensor P connected to the common trunk portion B0. The pressure sensor P may be electrically coupled to the electronic control unit (3, 3'). The pressure sensor P can provide information for managing the operation between the engine-driven air compressor C1 and the electrically-driven air compressor C2. The electronic control unit (3, 3') may selectively control for instance the electro-pneumatic valve 43 of the coupler/clutch 41 depending on a selected drive mode. Based on the selected drive mode, air pressure and air flow demand might differ. The pressure sensor P can be thus configured to recognize the air demand in the pneumatic system and depending on sensed pressure, the electronic control unit (3, 3') may operate the coupler/clutch 41. In other example of this invention (not shown), the electronic control unit (3, 3') can also turn on or off the electric motor M2 or the ICE engine 4, depending on sensed pressure by the pressure sensor P. Further, the pressure sensor P can sense an air pressure prevailing at least in the at least one air reservoir.

Figure 3:
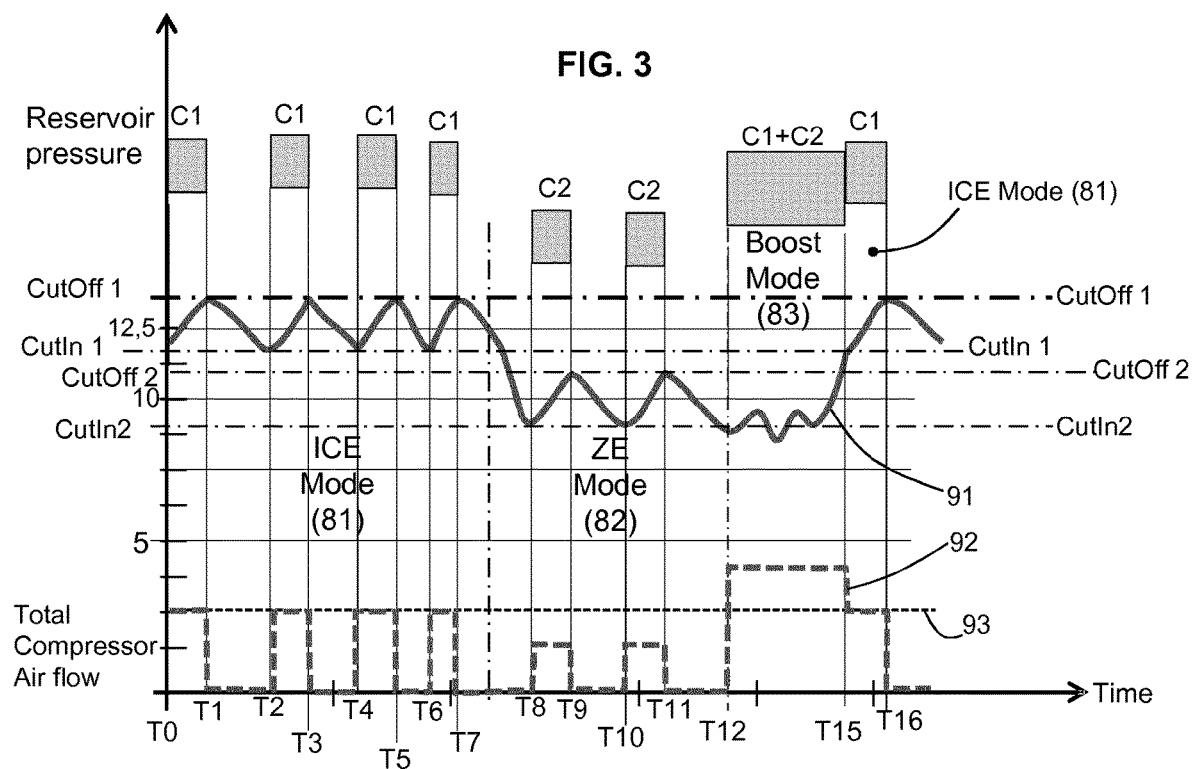
FIG. 3 shows a typical timing chart representing various operation modes (drive modes), with air pressure and compressor air flow.

Further, the pressure sensor P connected to the electronic control unit (3, 3') enables to manage the pressure according to the maximum and minimum threshold values (high and low threshold values denoted cut-in 1, cut-off 1, cut-in 2 and cut-off 2), in particular in basic operations modes such as ICE mode 81 and ZE mode 82, with regard to FIG. 3.

In the ICE mode, the ICE engine 4 is in operation, the engine-driven air compressor C1 is selectively used, the electrically-driven air compressor C2 is not used. In the ICE mode, the condition whether the engine-driven air compressor C1 is put into operation or not depends upon first low and high threshold values which are represented by cut-in 1 and cut-off 1. When the sensed pressure in the air reservoir(s) drops under the first low threshold value (cut-in 1) the engine-driven air compressor C1 is turned on, e.g. coupled to the running ICE engine 4, as illustrated at instants T2,T4,T6 on FIG. 3. Conversely, when the pressure in the air reservoir(s) reaches the first high threshold value (cut-off 1), the engine-driven air compressor C1 is turned off, e.g. decoupled/disconnected from the ICE engine 4, as illustrated at instants T1,T3,T5,T7,T16 on FIG. 3. In other words, this regulation normally maintains the available pressure between Cut-in 1 and Cut-off 1.

In the ZE mode, the ICE engine 4 is stopped, the engine-driven air compressor C1 is not used, and the electrically-driven air compressor C2 is selectively used. In the ZE mode, the condition whether the electrically-driven air compressor C2 is put into operation or not depends upon second low and high threshold values which are represented by cut-in 2 and cut-off 2. When the sensed pressure in the air reservoir(s) drops under the second low threshold value (cut-in 2) the electrically-driven air compressor C2 is turned on, e.g. driven by the electric motor M2) as illustrated at instants T8,T10,T12 on FIG. 3. Conversely, when the pressure in the air reservoir(s) reaches the second high threshold value (cut-off 1), the electrically-driven air compressor C2 is turned off as illustrated at instants T9,T11 on FIG. 3. In other words, this regulation normally maintains the available pressure between Cut-in 2 and Cut-off 2.

We note here that second high and low threshold values cut-in 2 and cut-off 2 are respectively lower than first high and low threshold values denoted cut-in 1, cut-off 1, the reason is explained below. Also, more details about operating modes will be given later.

Sizes/Performances

As can be apparent from FIG. 1, the electrically-driven air compressor C2 is downsized compared to the engine-driven air compressor C1. More particularly, a weight of the electrically-driven air compressor C2 itself (weight of the electric motor M2 is excluded) can be less than 70% of a weight of the engine-driven air compressor C1. More particularly, the weight of the electrically-driven air compressor C2 itself can be less than 60% of a weight of the engine-driven air compressor C1. In another preferred variant, the weight of the electrically-driven air compressor C2 itself can be less than 50% of a weight of the engine-driven air compressor C1.

Additionally to the weight, it is preferred the electrically-driven air compressor C2 has dimensions circumscribed in a volume of 600 mm×360 mm×370 mm in terms of length× width×height. Preferably, the dimensions of the electrically-driven air compressor C2 can be 500 mm×260 mm×270 mm (length×width×height).

Thanks to this arrangements, the electrically-driven air compressor C2 is designed to be smaller than the engine-driven air compressor C1 and offers more freedom for arrangement and integration in the respective hybrid or eco-friendly vehicle (room optimization). Manufacturers has thus ability to design their vehicles in a way of having less fuel consumption due to less weight of the electrically-driven air compressor C2, or the vehicles can be more compact (regarding their size) since the space required for the pneumatic system is smaller while a pneumatic capability of the pneumatic system is at least the same or even higher compared to the known vehicles already in operation. Besides, another advantage of this arrangement is lower costs compared to the conventional electrically-driven air compressors having the same dimensions and weights as the engine-driven air compressor.

The pneumatic capability of the pneumatic system is understood as a value defining a maximum air flow output from the air compressor at a maximum pressure rating.

According to the present disclosure, we define a pneumatic capability reference which is the pneumatic capability of a single ICE driven air compressor configuration.

Figure 2:
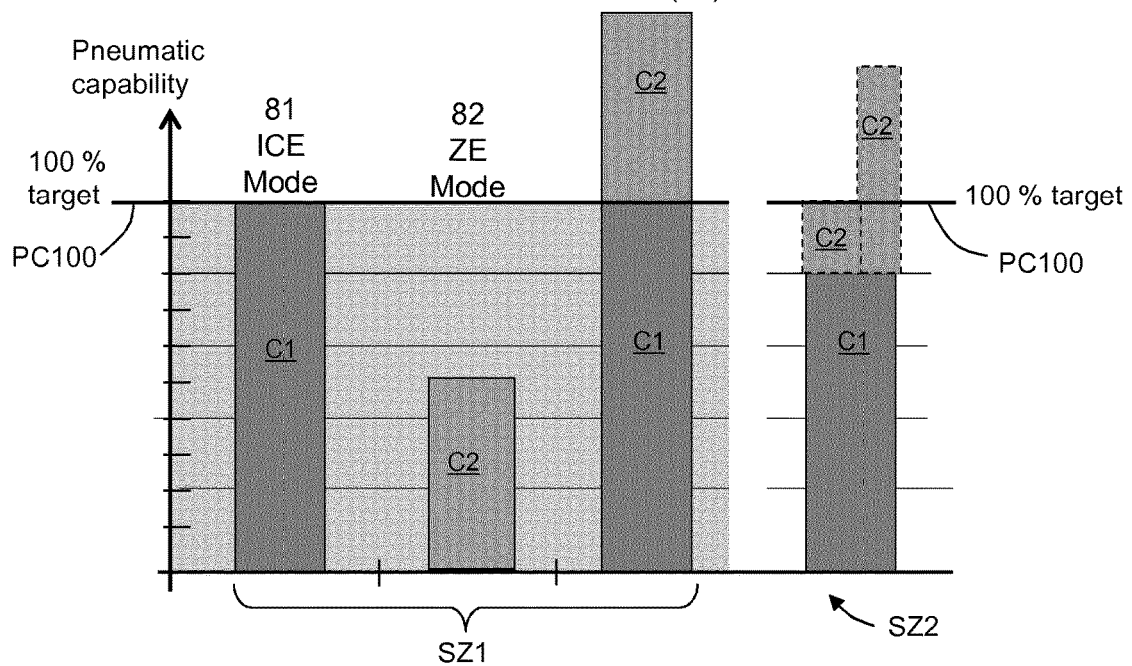
FIG. 2 illustrates various operation modes and relative performance in various operation modes.

In other words, if we consider a vehicle (truck, bus, . . . ) with no hybridization at all, but having a given compressed air requirements, this will define a single-compressor pneumatic capability, also called hereafter "100% target pneumatic capability" (PC100 as illustrated in FIG. 2). The compressed air requirements are the results of all the needs and requirements of the braking system, the suspension system and all possible other auxiliary systems that may require compressed air, in term of flow and in terms of available pressure.

The dual compressors solution promoted herein is designed to be installed in a similar or identical vehicle (truck, bus, . . . ) having the same above mentioned compressed air needs and requirements, therefore we refer in the following to the "100% target pneumatic capability" PC100 or "single-compressor pneumatic capability".

According to an embodiment, the pneumatic capability of the electrically-driven air compressor C2 can lie within 5% to 60% of the pneumatic capability of the engine-driven air compressor C1. Preferably, the pneumatic capability of the electrically-driven air compressor C2 can lie within 10% to 60% of the pneumatic capability of the engine-driven air compressor C1. C2 max pressure is in practice below C1 max pressure; for this reason, Cut-off 2<Cut-off 1.

It is important to note here that when the vehicle is driven in ZE mode, its speed is low or moderate and the requirements regarding braking performance is lower than when the vehicle is running at top speed. It is advantageously taken profit from this difference to have a pneumatic capability of the electrically-driven air compressor C2 lower than the pneumatic capability of the engine-driven air compressor C1.

In practice, ZE mode is available only when the vehicle speed is below a predefined value ZETS comprised between 20 Km/h and 50 Km/h, (ZETS may be a calibration dependent value). Therefore, the kinetic energy to handle for braking is much lower than whenever the vehicle is driven above 50 Km/h. As a matter of example, given the kinetic energy goes with the square of the speed, if ZE mode is not available above 25 Km/h, and if we have a truck top speed of 100 Km/h, the ratio of respective kinetic energy is 16. This is a mere example to explain the high ratio that can be promoted regarding C2 versus C1.

Thus, the pneumatic system has an ability to be operated merely by the electrically-driven air compressor C2 which is capable to provide a sufficient pressure, sufficient air flow and pneumatic capability for the considered driving conditions, such that the hybrid or eco-friendly vehicle might be operated without the ICE engine running (e.g. moving of the vehicle is provided by an electric motor or motors connected to a battery unit—ZE mode) while the sufficient amount of pressurized air is being supplied to the pneumatic system or systems.

In various operation modes described later, there can be defined a boost mode (likewise called combined mode) which enables to operate the electrically-driven air compressor C2 together with the engine-driven air compressor C1 simultaneously providing higher air flow than in the basic operation mode (where the air flow/pressure is provided by one of the compressors). Both the engine-driven air compressor C1 and electrically-driven air compressor C2 can operate at maximum power to provide a pneumatic output higher than the single-compressor pneumatic output reference; the pneumatic output can be in the range [100%-160%] of the single compressor pneumatic capability as long as the pressure in the air reservoir(s) is below the maximum pressure capability of the electrically-driven air compressor—second high threshold value cut-off 2.

The combined/boost mode can be used in a situation where the reservoirs have been purged or the vehicle have not been used for some time and the reservoir are nearly empty. In this case the use of the boost mode can shorten the time necessary to reach the lower proper pneumatic pressure (i.e. 7.2 bar).

In the above examples, the engine-driven air compressor C1 and electrically-driven air compressor C2 can be known types of compressors, where the working pressure range of the electrically-driven air compressor C2 can lie within 7.2 to 11 bar (this may correspond to Cut-in 2 and Cut-off 2). The working pressure of the engine-driven air compressor C1 can lie within 7.2 to 13 bar (this may correspond to Cut-in 1 and Cut-off 1). The working pressure of the compressor is the range of the minimum acceptable pressure threshold and the maximum threshold for sufficient air pressure/airflow demand. It is however not omitted, that each of the compressors C1, C2 can run below 7.2 bar and for instance they are capable to run even from 0 bar (e.g. for initial inflation of reservoir or after purge for maintenance).

Besides, an output air flow range can lie within 100 to 250 l/min at maximum pressure of 11 bar for the electrically-driven air compressor C2. An output air flow range of the engine-driven air compressor C1 can lie within 300 to 2000 l/min at maximum pressure of 13 bar depending on the engine RPM, i.e. the pneumatic output may be somewhat proportional to engine speed (RPM) and the above values may be achieved only above a certain RPM (like 1000/1500 RPM). Preferably, the output air flow range of the engine-driven air compressor C1 can lie within 600 to 2000 l/min at maximum pressure of 13 bar depending on the engine RPM. Furthermore, the power consumption range of the engine-driven air compressor C1 can lie within 1 to 6 kW. The power consumption range of the electrically-driven air compressor C2 can lie within 1.5 to 2.5 kW. For the purposes of the present invention, the engine-driven air compressor C1 can be a mono-cylinder compressor having a displacement of 360 cm$^3$, or a bi-cylinder compressor having a displacement of 720 cm$^3$. A displacement of the electrically-driven air compressor C2 can be typically from 200 cm$^3$ to 300 cm$^3$.

This arrangement further enables to achieve lower electric power consumption which might extend the driving range of the hybrid or eco-friendly vehicle in full electric drive mode, known as ZE mode (zero-emission mode).

Operation Modes and Control Logic

Further, FIGS. 2 and 3 illustrate examples of various operation modes and relative performance thereof having regard to the pneumatic capability. The basic operation mode can be understood as a condition when only one of the engine-driven air compressor C1 or the electrically-driven air compressor C2 is in operation. Depending on the current drive mode and/or work mode, the electronic control unit (3, 3'), selects the most appropriate operation mode and put it into operation. The operation mode can be chosen among ICE mode, zero-emission mode (ZE), combined/boost mode and high torque demand mode (HT mode).

As shown in FIG. 2, left part, in ICE mode 81, the pneumatic output of the pneumatic system depends merely on operation of the engine-driven air compressor C1. In a first embodiment, denoted by configured SZ1, the engine-driven air compressor C1 can provide up to the target pneumatic capability of the pneumatic system (100% of PC100). Typical example of the ICE mode can be a situation where the battery unit (BATT) does not have enough power to run the vehicle (e.g. conditions for the ZE mode are not met) or the electrically-driven air compressor C2, or the battery unit (BATT) needs to be re-charged from motor/generator 6. Other example of the ICE mode can be a situation where the pneumatic demand is higher than the single pneumatic capability of the electrically-driven air compressor C2.

FIG. 3 shows a typical timing chart for the operation modes, where top curve 91 represents air pressure in the main circuit and bottom curve 92 represents air flow outputted by one or two compressors. As can be seen, one axis is represented by time, and air reservoir(s) pressure is shown along the second axis together with total compressor air flow at the bottom dotted line 92. For the ICE mode, the condition whether the engine-driven air compressor C1 is put into operation or not depends upon first low and high threshold values which are represented by cut-in 1 and cut-off 1, as explained above. As depicted, the available pressure therefore oscillates between the lower threshold value cut-in 1 and the upper threshold value cut-off 1. When the compressor C1 is ON, the air flow (curve 92) is at level 100% of C1 flow (denoted 93), the rest of the time the air flow is at 0.

Further, FIG. 2 shows the zero-emission mode 82 represented in short as the ZE mode.

That is, the ZE mode requires merely electrical energy for running the vehicle, e.g. the vehicle uses its own electric power network. The electrical energy provided to the electric motor M2 which can be mechanically coupled/connected to the electrically-driven air compressor C2 can be generated directly from motor/generator 6 or from stored energy in the battery unit (BATT). In ZE mode, the pneumatic capability of the pneumatic system depends merely on operation of the electrically-driven air compressor C2 which can provide up to 60% of the target pneumatic capability PC100. A skilled person would recognize that the vehicle in the ZE mode produces 0% carbon oxides.

As shown in FIG. 3, the condition whether the electrically-driven air compressor C2 is put into operation or not depends upon second low and high threshold values which are represented by cut-in 2 and cut-off 2. The available pressure therefore oscillates between the lower threshold value cut-in 2 and the upper threshold value cut-off 2.

When the compressor C2 is ON, the air flow (curve 92) is at level 50% of C1 flow (as a non-limiting example), the rest of the time the air flow is at 0.

FIG. 2 further shows the boost/combined mode 83 as another example of operation mode. The combined mode is with the following conditions:
the ICE engine 4 is in operation;
the engine-driven air compressor C1 is in operation;
the electrically-driven air compressor C2 is in operation.

The boost/combined mode thus requires operation of both the engine-driven C1 and electrically-driven C2 air compressors. Consequently, it requires the ICE engine 4 to be in operation. The combined mode combines operation of both air compressors C1 and C2 in a situation where there is a need for a higher air flow demand which cannot be satisfied by solely use of one of the engine-driven air compressor C1 or the electrically-driven air compressor C2. In the combined mode, the pneumatic capability of the system depends on pneumatic capabilities of both the compressors (C1, C2) which can provide the single compressor pneumatic capability from 100% up to 160%. Total air flow is in the shown example at about 150% of C1 flow.

An example of the combined mode can be a situation where a higher air flow demand is needed, for example when the suspension system draw a high amount of compressed air. There are other auxiliary systems that can also require, under particular operation, higher air flow demand. An example of the combined/boost mode is used to speed up inflation of reservoir when starting from a low pressure or empty reservoir.

As shown in FIG. 3, the boost/combined mode can be selected by the at least one control unit (3, 3') in a situation where high air demand for the pneumatic system is needed. In such situation, the air pressure in the air reservoir(s) can dramatically drop and for maintaining the pressure at much as possible, while providing high air flow to the pneumatic system(s), the simultaneous operation of both compressors (C1, C2) is desirable. It is noted that in such mode, the pressure can drop below Cut-in 2, but this does not cause the stop of compressor operation.

As soon as the air pressure reaches the second high threshold value (cut-off 2) of the electrically-driven air compressor C2, the boost/combined mode can be switched by the control unit (3, 3') to ICE mode, illustrated at instant T15 on FIG. 3. As an example, FIG. 3 shows that after the pressure in the air reservoir(s) reaches the cut-off 2 value, the motor M2 stopped and the control unit (3, 3') switches to the ICE mode.

It is noted that in order to put the boost/combined mode in operation, in certain cases, the control unit (3, 3') may cause the engine controller (not shown) to start the engine if the engine was stopped before (event when the vehicle is parked).

Another example (not shown) of the drive mode is so called high torque demand mode (HT mode), which may arise when all the available torque of the engine shall be directed to the drivetrain to move the truck (e.g. steep uphill road or overtaking another vehicle) sometimes called "torque load shedding".

The HT mode is a transitory situation where more torque generated by the ICE engine is required than during constant speed on relatively flat or downhill surface (road). Such situation can depend on the gas pedal position. The control unit (3, 3') can additionally receive information from the sensor of the gas pedal (not shown) and depending on the sensed position, the control unit (3, 3') can determine whether the HT mode is required or not. Decoupling engine-driven air compressor C1 from the ICE engine 4 reduces power load on the ICE crankshaft which therefore can give more power and more torque to the drive axle of the vehicle The following conditions are fulfilled in HT mode:
the ICE engine 4 is in operation;
the engine-driven air compressor C1 is inhibited;
the electrically-driven air compressor C2 is in used.

The HT mode thus enables to provide sufficient air flow demand to the pneumatic system(s) through the electrically-driven air compressor C2 while the vehicle does not suffer from lower torque provided with the ICE engine 4 to the drive axle due to high load on the ICE engine 4.

Besides, additionally, during the HT mode, the control unit (3, 3') can be connected to the other systems requiring power from the ICE engine 4, e.g. an air-conditioning system. That is, during the HT mode, the control unit (3, 3') can additionally turn off both the electrically-driven air compressor C2 and/or the air-conditioning system. In such situation, the power load on the ICE engine 4 is even more reduced and the torque to the drive axle is higher.

It should be noted that when the vehicle speed is above a certain threshold, let's say 80 Km/h, this may inhibit the decoupling of C1 in order to preserve high pressure braking in case it is needed, high pressure being supplied only by C1.

Figure 4:
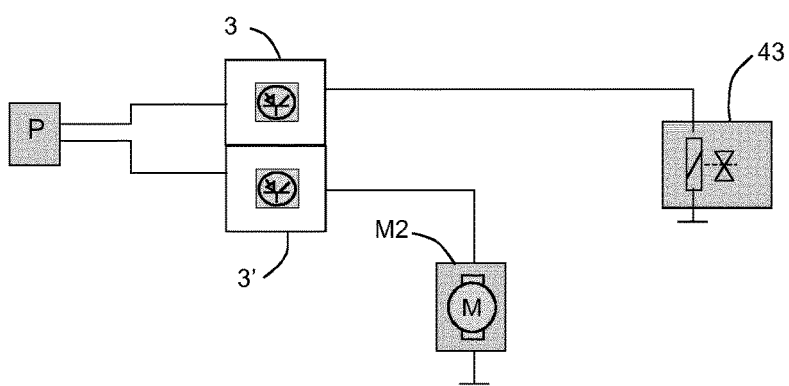
FIG. 4 illustrates an exemplary control circuit diagram.

FIG. 4 shows a non-limiting example of a control unit diagram. In this example, the pneumatic system can be provided with two differently provided control units (3, 3'). The first control unit 3 can be interposed between the pressure sensor P and the electro-pneumatic valve 43. The pressure sensor P delivers in real time electrical signals representative of the pressure prevailing in the reservoir(s) to the first and second control units 3,3'. The first control unit 3 controls the electro-pneumatic valve 43.

The second control unit 3' can be interposed between pressure sensor P and the electric motor M2. The second control unit 3' controls the electric motor M2. M2 is preferably controlled in ON/OFF mode although a variable speed control is not excluded.

The first control unit 3 can be configured to selectively control the electro-pneumatic valve 43 and enabling to selectively (de)couple/(dis)connect the pneumatically controlled coupler 41, depending on various operation modes described above, the first control unit 3 electrically controls operation modes of the engine-driven air compressor C1.

The second control unit 3' can control the power supply to the electric motor M2 which can directly drive the electrically-driven air compressor C2, depending on various operation modes, the second control unit 3' electrically controls the operation mode of the electrically-driven air compressor C2.

In one embodiment, the first and second control units (3, 3') can be coupled to a vehicle central unit (VCU). The VCU might collect the electrical signals from the pressure sensor P, electrical signals representative of battery unit capacity and charge level, electrical signals representative of a gas pedal position, of any malfunction in the system, etc.

Based on sensed data, the VCU can output a signal to each of the control units (3, 3') to control the operation of the engine-driven and/or electrically-driven air compressors (C1, C2).

Figure 5:
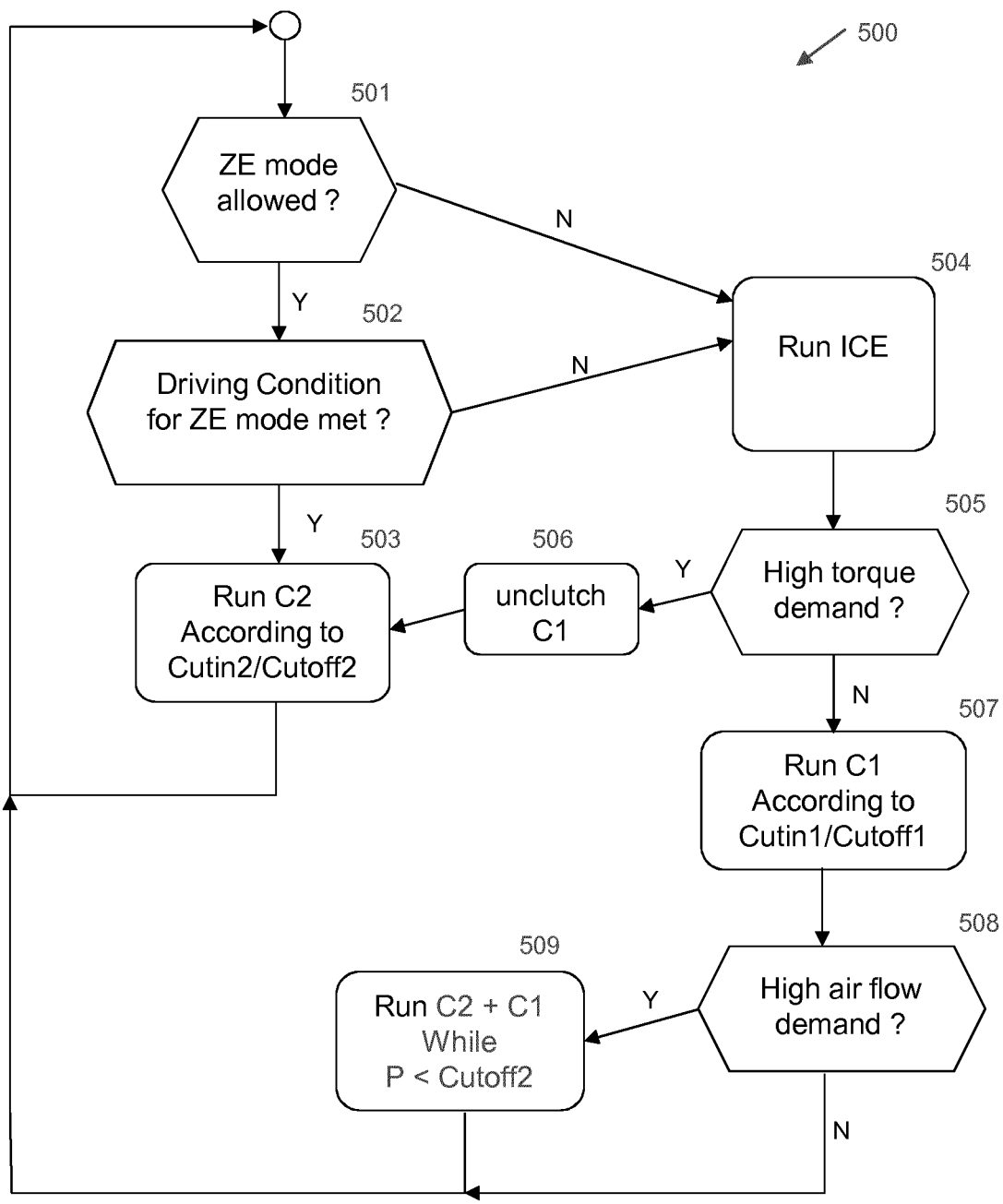
FIG. 5 shows an example of logic flowchart illustrating the method carried out in at least one embodiment.

FIG. 5 shows an example of logic flowchart 500 illustrating the operation modes logic. At the first step 501, it is determined via a control logic, by the control units (3, 3'), whether the ZE mode is allowed or not. Such determination can depend on various factors, e.g. battery unit capacity or power network status. The power network status can represent for instance a malfunction in the power network system which might limit power network performance.

If the conditions for allowing the ZE mode are fulfilled, at step 502 the control logic determines whether the conditions for ZE mode are met or not. At this step, one major criterion to enable ZE drive is vehicle speed. Typically, ZE mode is available only when the vehicle speed is below a predefined value ZETS comprised between 20 Km/h and 50 Km/h. In other words, ZE is only enabled in the speed range [0 Km/h—ZETS]. It is noted that at this step, it is already known from step 501 that the battery unit (BATT) stores enough energy for running the vehicle in ZE mode. It is also understood that the control unit (3, 3') also decouples/disconnects the engine-driven air compressor C1 from the ICE engine 4, if running so. At this step 502, if high air flow is required, the ICE engine operation is required and therefore, ZE mode only is not enough for supplying boost/combined air delivery.

If the condition of step 502 is fulfilled, the ZE Drive controller (not shown) controls the motor M/G 6 according to the gas pedal to move the vehicle, and the pneumatic control logic (i.e. the control unit 3, 3') runs the electric motor M2 connected to the electrically-driven air compressor C2. It is also understood that the ICE engine 4 is stopped. Operation mode of the electrically-driven air compressor C2 depends upon second low and high threshold values (cut-in 2, cut-off 2) of the reservoir pressure (step 503, already exposed above).

On the contrary, if none of the above conditions of steps 501 and/or 502 is fulfilled, the control logic outputs a signal to run the ICE engine 4 at step 504. This case arises for example as long as the vehicle speed is above ZETS, and represents the 'normal' drive mode on roads or motorways for a hybrid vehicle.

Once the ICE engine 4 and the engine-driven compressor C1 are in operation, the control logic determines at step 505 whether the vehicle is in condition which requires high torque demand. If high torque is needed, at step 506 the control logic decouples the engine-driven air compressor C1 from the ICE engine 4 to reduce power load of the ICE engine 4, and puts the electrically-driven air compressor C2 into operation depending upon second low and high threshold values (cut-in 2, cut-off 2) of the reservoir pressure (step 503).

If however, the high torque demand is not needed, the control logic runs merely the engine-driven air compressor C1 (step 507), while the electrically-driven air compressor C2 is off (no power supply to the electric motor M2). In such case, operation mode of the engine-driven air compressor C1 depends upon first low and high threshold values (cut-in 1, cut-off 1) of the reservoir pressure. This mode is also so called the ICE mode, as described earlier in the application.

Next, at step 508, the control logic determines whether high air flow demand is needed or not. If there is no need for high air flow delivered from the compressors (C1, C2), no further action is required and the diagram starts from its beginning in condition from the last step, e.g. in the ICE mode. If however, the high air flow demand is required, at step 509 the combined mode (or boost mode) is activated. That is, both compressors (C1+C2) are put into operation simultaneously while the operation mode of both compressors is active as long as the pressure in the air reservoir(s) is below the second high threshold value (cut-off 2).

In the first embodiment, denoted by configured SZ1 (left part of FIG. 2), the engine-driven air compressor C1 is designed to provide the target pneumatic capability of the pneumatic system (100% of PC100). As already set out, the electrically-driven air compressor C2 is downsized with regard to C1 (here same as PC100). In other words, engine-driven air compressor C1 is same as the reference in the non-hybrid truck, and C2 is a smaller compressor.

In another embodiment, as illustrated at the right part of FIG. 2, denoted by SZ2, the engine-driven air compressor C1 can be downsized to provide less than 100% of the target pneumatic capability (less than 100% of the single compressor pneumatic capability). In practice, the engine-driven air compressor C1 can be designed to provide 50% to 90% of the target pneumatic capability (50% to 90% of PC100).

On the other side, the pneumatic capability of the electrically-driven air compressor C2 can be between 20% to 50% of the target pneumatic capability. That is, simultaneous operation of both air compressors (C1, C2) can provide at least 100% of the target pneumatic capability, at least in terms of air flow, as long as the pressure in the air reservoir(s) is below the maximum pressure capability of the electrically-driven air compressor—below the second high threshold value cut-off 2. Therefore, both the engine-driven air compressor C1 and the electrically-driven air compressor C2 are downsized compared to the single compressor pneumatic capability reference configuration (for instance in in terms of weight, dimensions, pneumatic capability, etc.). This represents an optimized solution which still meets all the pneumatic needs and requirements in terms of flow/pressure.

It should be noted that regenerative braking can be performed in any drive/operation mode, not only the ZE mode; M/G 6 is used in generator/braking mode and thus this is a further way to decrease the need of pneumatic flow for pneumatic braking and this enables to further optimize the sizing of compressors C1 and C2.

The invention claimed is:
1. A method to control a system for generating air pressure for a hybrid vehicle, comprising:
when an ICE engine is in operation and there is no high torque demand and no high air flow demand, running an engine-driven air compressor while an electrically-driven air compressor is stopped, wherein running of the engine-driven air compressor depends upon first low and high pressure threshold values in at least one air reservoir (cut-in 1, cut-off 1), the first low pressure threshold value (cut-in 1) turns on and the first high pressure threshold value (cut-off 1) turns off the engine-driven air compressor, the at least one reservoir connected to an outlet of the engine-drive air compressor and an outlet of the electrically drive air compressor;
when the ICE engine is in operation and there is high torque demand, running the electrically-driven air compressor while the engine-driven air compressor is stopped, wherein running of the electrically-driven air compressor depends upon second low and high pressure threshold values in the at least one air reservoir (cut-in 2, cut-off 2), the second low pressure threshold value (cut-in 2) turns on and the second high pressure threshold value (cut-off 2) turns off the electrically-driven air compressor;

when the ICE engine is not in operation and zero-emission driving conditions are met and zero-emission mode is allowed, running solely the electrically-driven air compressor dependent upon the second low and high pressure threshold values (cut-in 2, cut-off 2); and when the ICE engine is in operation and there is no high torque demand and there is high air flow demand, running both the engine-driven air compressor and the electrically-driven air compressor, wherein running of both the compressors is provided as long as the pressure in the at least one air reservoir is below the second high pressure threshold value (cut-off 2).

2. A method for controlling a system for generating air pressure for a hybrid vehicle, comprising:

when an ICE engine is in operation and an electronic control unit determines there is no high torque demand and no high air flow demand, the electronic control unit is configured to run an engine-driven air compressor while an electrically-driven air compressor is stopped, wherein running of the engine-driven air compressor depends upon first low and high pressure threshold values (cut-in 1, cut-off 1) in at least one air reservoir, the first low pressure threshold value (cut-in 1) turns on and the first high threshold value (cut-off 1) turns off the engine-driven air compressor, the at least one reservoir connected to an outlet of the engine-drive air compressor and an outlet of the electrically drive air compressor, the electrically-driven air compressor has smaller dimensions and weight compared to the engine-driven compressor and the electrically-driven air compressor is configured to provide less air flow and air pressure compared to the engine-driven compressor;

when the ICE engine is not in operation and the electronic control unit determines zero-emission driving conditions are met and zero-emission mode is allowed, the electronic control unit is configured to run solely the electrically-driven air compressor dependent upon the second low and high pressure threshold values (cut-in 2, cut-off 2) in the at least one air reservoir, wherein the second low pressure threshold value (cut-in 2) turns on and the second high pressure threshold value (cut-off 2) turns off the electrically-driven air compressor; and when the ICE engine is in operation and the electronic control unit determines there is no high torque demand and there is high air flow demand, the electronic control unit is configured to run both the engine-driven air compressor and the electrically-driven air compressor, wherein running of both the compressors is provided as long as the pressure in the at least one air reservoir is below the second high pressure threshold value (cut-off 2).

3. The method according to claim 2, further comprising:

when the ICE engine is in operation and the electronic control unit determines there is high torque demand, the electronic control unit is configured to run the electrically-driven air compressor while the engine-driven air compressor is stopped, wherein running of the electrically-driven air compressor depends upon the second low and high pressure threshold values (cut-in 2, cut-off 2).

* * * * *